United States Patent
Diao

(10) Patent No.: US 7,386,523 B2
(45) Date of Patent: Jun. 10, 2008

(54) K-MEANS CLUSTERING USING T-TEST COMPUTATION

(75) Inventor: Qian Diao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 491 days.

(21) Appl. No.: 10/955,603

(22) Filed: Sep. 29, 2004

(65) Prior Publication Data

US 2006/0069709 A1    Mar. 30, 2006

(51) Int. Cl.
*G06N 5/00*    (2006.01)
(52) U.S. Cl. .......................................... 706/25; 702/19
(58) Field of Classification Search ................ 706/25, 706/45; 600/410; 378/169, 56; 702/16
See application file for complete search history.

(56) References Cited

U.S. PATENT DOCUMENTS 6,385,479 B1 *   5/2002   Sibbitt et al. ............... 600/410
6,690,761 B2 *   2/2004   Lang et al. .................... 378/56
6,811,310 B2 *  11/2004   Lang et al. ................... 378/169
6,996,476 B2 *   2/2006   Najarian ....................... 702/19

* cited by examiner

*Primary Examiner*—Wilbert L Starks, Jr.
(74) *Attorney, Agent, or Firm*—Blakely, Sokoloff, Taylor & Zafman LLP

(57) ABSTRACT

A method, apparatus, and system are provided for k-means clustering using t-test computation. According to one embodiment, k-means clustering is performed on a dataset. In performing k-means clustering, the dataset having various points is partitioned into several clusters. The closeness of a given point to a given cluster is determined. Then, t-test computation is performed to determine statistical linear relationship between the point and the cluster. If the point is found to be close to the cluster and a statistical linear relationship is found between the point and the cluster, the current position of the point is maintained.

22 Claims, 5 Drawing Sheets

K-MEANS CLUSTERING USING T-TEST COMPUTATION

BACKGROUND

1. Field of the Invention

Embodiment of this invention relate generally to clustering. More particularly, an embodiment of the present invention relates to k-means clustering using t-test computation.

2. Description of Related Art

Clustering is mathematical formulation-based measure of similarity between various objects. Clustering is used to obtain a collection of objects which are similar between them and are dissimilar to the objects belonging to other clusters. This multivariate statistical analysis-type clustering is also known as unsupervised clustering analysis, numerical taxonomy, and classification analysis. For example, in molecular biology, clustering is used to group or sort biological genes or samples into separate clusters based on their statistical behavior so that the degree of association is strong between members of the same cluster and weak between members of different clusters. Examples of clustering techniques include Jarvis-Patrick, Agglomerative Hierarchical, Self Organizing Map (SOM), and K-means.

K-means clustering is a simple unsupervised learning algorithm that is used to solve some well-known clustering problems. The K-means algorithm is used to generate fixed-sized, flat classifications and clusters based on distance metrics for similarity. The conventional K-means clustering algorithm follows a simplistic way to classify a given data set through a given number of clusters (e.g., k clusters) fixed at a pirori. Stated differently, the k-means algorithm starts with an initial partition of the cases into k clusters (e.g., assign a value of k at initialization). The process then continues with modification of the partition to reduce the sum of the distances for each case from the mean of the cluster to which the case belongs. One problem with the conventional k-means is that a certain initial value of k has to be assigned based only on estimations. Such value of k is often incorrect and negatively impacts the final result.

One way to reduce the impact of the k value is to rerun the algorithm with different randomly generated starting partitions or initial k values. Because the number of true clusters in the data is not known, the algorithm is run with different values for k that are closer to the number of clusters expected from the data to determine how the sum of distances reduces with increasing values of k. However, this conventional approach of rerunning the k-means algorithm is time consuming, inefficient, cumbersome, and still does not eliminate or significantly reduce the negative impact of k on the final solution.

BRIEF DESCRIPTION OF THE DRAWINGS

The appended claims set forth the features of the embodiments of the present invention with particularity. The embodiments of the present invention, together with its advantages, may be best understood from the following detailed description taken in conjunction with the accompanying drawings of which:

DETAILED DESCRIPTION

Figure 1:
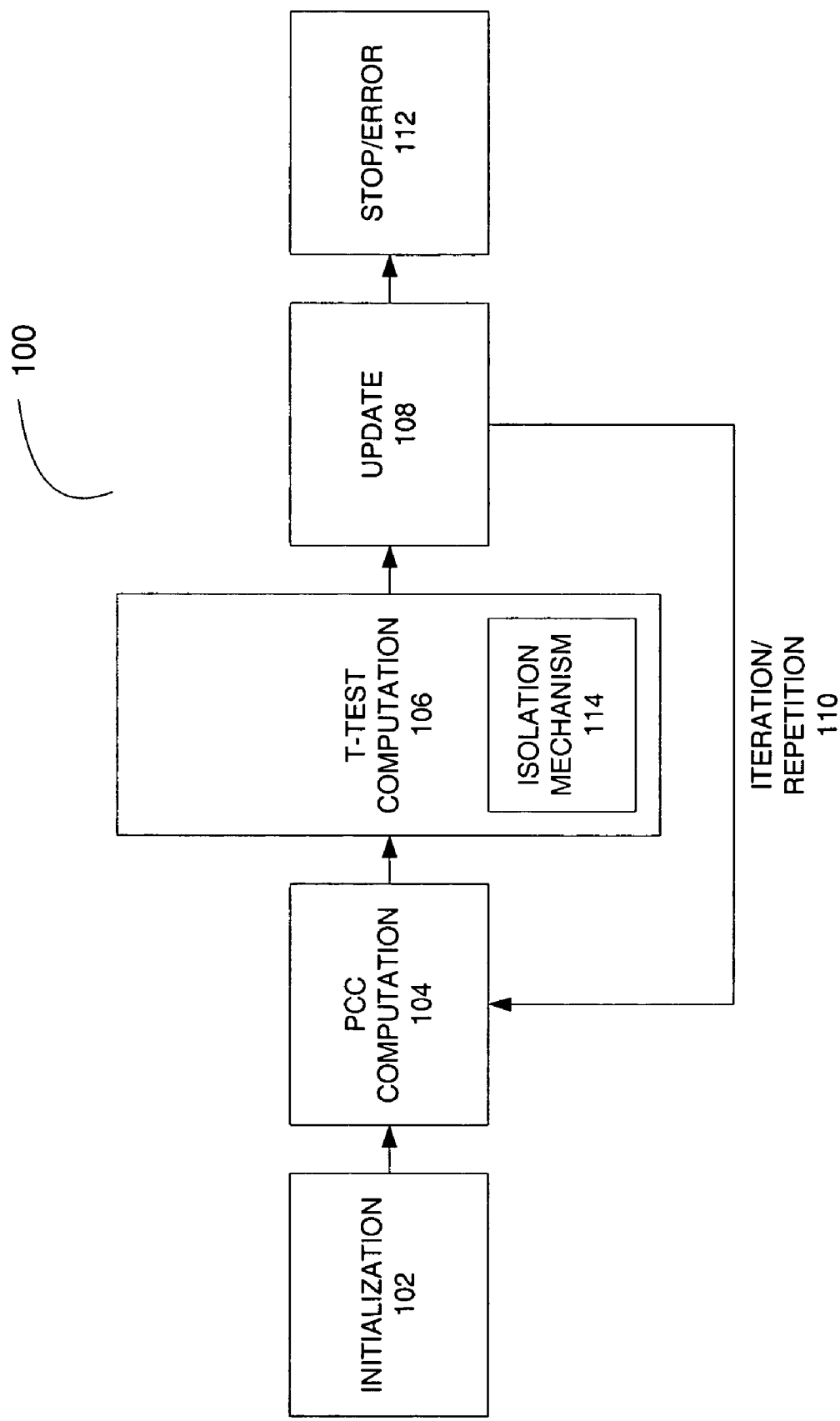
FIG. 1 is a block diagram illustrating an embodiment of k-means clustering using t-test computation.

Described below is a system and method for k-means clustering using t-test computation. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIG. 1 is a block diagram illustrating an embodiment of k-means clustering 100 using t-test computation 106. In one embodiment, k-means clustering 100 of verifying the correlation between a point and its nearest cluster is performed using t-test computation 106 to evaluate if the clustering result has its statistical significance. The use of t-test computation 106 with the k-means algorithm for k-means clustering 100 eliminates the reliance on and impact of the initial value of k, for example, in gene clustering, by performing clustering without any initial partition (e.g., value of k). This helps eliminate results that are bad because of the incorrect initial value of k. Stated differently, in one embodiment, the results or final solution of k-means clustering 100 can start with any value of k (e.g., k=1) at the initialization state 102, because when using t-test computation 106 with k-means clustering 100, the value of k become irrelevant with regard to the final solution. Thus, the final solution of k-means 100 with t-test computation 106 is a true solution, because it is not corrupted by the initial value of k.

In one embodiment, at initialization 102 (e.g., function t-test_k-means(k,ε)), an initial value of k (e.g., k=1) is assigned. Similarly, an initial value of ε is assigned (e.g., ε=0.00001) to represent a small error value. The occurrence of the error 112 results in ending of iterations or repetition 110 of the process. Further, as part of initialization 102, the dataset (e.g., $g_1, \ldots g_i, \ldots g_M$) is randomly partitioned into clusters (e.g., k=k' clusters). Here, each g represents a point or vector in the space (of the dataset), where $g_M$ represents the M point in that space. Although, in one embodiment, t-test computation 106 is used with k-means clustering 100, the cost of the algorithm, in term of computation complexity, remains the same as of the standard k-means clustering. Here, for example, M=cardinality of the database, k=number of clusters, and N=number of attributes. In this case, the per iteration cost=MkN and the total cost (t iterations)=O (tMkN), where t represents the number of iterations and O represents operation.

For each $g_i$, $g_i=(s_i^1, \ldots, s_i^N)$, N is the sample number. Using the dataset, the distance between a point and a cluster is calculated to ultimately determine the distance between a point and the nearest cluster. The distance between a point and a cluster is calculated using Pearson's Correlation Coefficient (PCC) 104. PCC 104 is used to measure the strength of the linear relationship between two variables. In other words, PCC 104 is applied to measure the similarities and the distance between two profiles. In this case, given the point (e.g., $g_i$) is a high dimension point, PCC 104 is used to compute the distance between the point ($g_i$) and the mean cluster (Mc). However, it is contemplated that any number of measurement methods may be used to determine the parameter that specifies the distance between data points and clusters. Examples of other measurement methods include Euclidean, Euclidean Squared, Manhattan, Person Squared, Chebychev, and Spearman.

The basic formula for PCC distance is: d=1−r, where r=z(x).z(y)/n is the dot product of the z-scores of the vectors x and y. The z-score of x is construction by subtracting from x its mean and dividing by its standard deviation. Using the PCC 104 to compute distance (d) between a point ($g_i$) and mean cluster (Mc) is as follows:

$$d(g_i, Mc_j) = \left| 1 - \frac{\sum g_i Mc_j - \frac{\sum g_i \sum Mc_j}{N}}{\sqrt{\left(\sum g_i^2 - \frac{(\sum g_i)^2}{N}\right)\left(\sum Mc_j^2 - \frac{(\sum Mc_j)^2}{N}\right)}} \right|,$$

the mean $$Mc_j = \frac{1}{|c_j|} \sum_{i=1}^{|c_j|} g_i, g_i \epsilon c_j, |c_j|$$

represents the number of elements in cluster $c_j$, j=1, . . . k

Once the distance between a point ($g_i$) and the mean cluster (Mc) is calculated, such information is then used to compute the distance between the nearest cluster (e.g., c) and its mean (Mc) to the point ($g_i$) is determined using the t-test computation 106 by computing the minimum distance between the point and the nearest cluster. T-test computation 106 is further described in FIG. 2. If the point is closest to and linear to its own cluster, the point and the cluster are left as they are. If the point is closest to and linear to another cluster, the point is moved into that cluster. If the point is not linear to the closest cluster, then the point is isolated and a new cluster is created using the isolation mechanism 114 according to one embodiment. The single newly created cluster includes the isolated point. For example, the clustering may begin with 7 clusters (number of clusters=7) and end with 8 clusters (number of clusters=7+1), which includes the newly created cluster using the isolation mechanism 114 that is based on using t-test computation 106.

Using mean $$Mc_j = \frac{1}{|c_j|} \sum_{i=1}^{|c_j|} g_i, g_i \epsilon c_j, |c_j|$$

mean cluster (Mc) is updated 108 representing the number of elements in cluster $c_j$. Updating 108 refers to updating the mean cluster when changes in the cluster formation are made, such as the creation of a new cluster having the point that was isolated. Once the update 108 is completed, the process is repeated 110 (e.g., iterations continues), until the error (ε) has occurred, at which point k-means clustering 100 stops 112. The error value was assigned at initialization 102 and is then used to stop 112 the process when Error_new−Error_old<=ε, where ε is some small constant, $$\text{Error} = \sum_{j=1}^{k} \sum_{i=1}^{|c_j|} d(g_i, Mc_j).$$

As illustrated, the values of k and ε are assigned at initialization 102, but when using k-means clustering 100 using t-test computation 106, according to one embodiment, the value of k is irrelevant with regard to the final solution. So, the final result is true and uncorrupted. It is contemplated that a number of software modules 102-106, 114 perform various parts and processes of k-means clustering with t-test computation. It is contemplated that hardware, software, or a combination thereof, may be used to perform k-means clustering 100. For example, initialization 102, PCC computation 104, t-test computation 106, isolation mechanism 114, updating 108, repetition 110, and stopping 112 may be performed by various modules and components.

Figure 2:
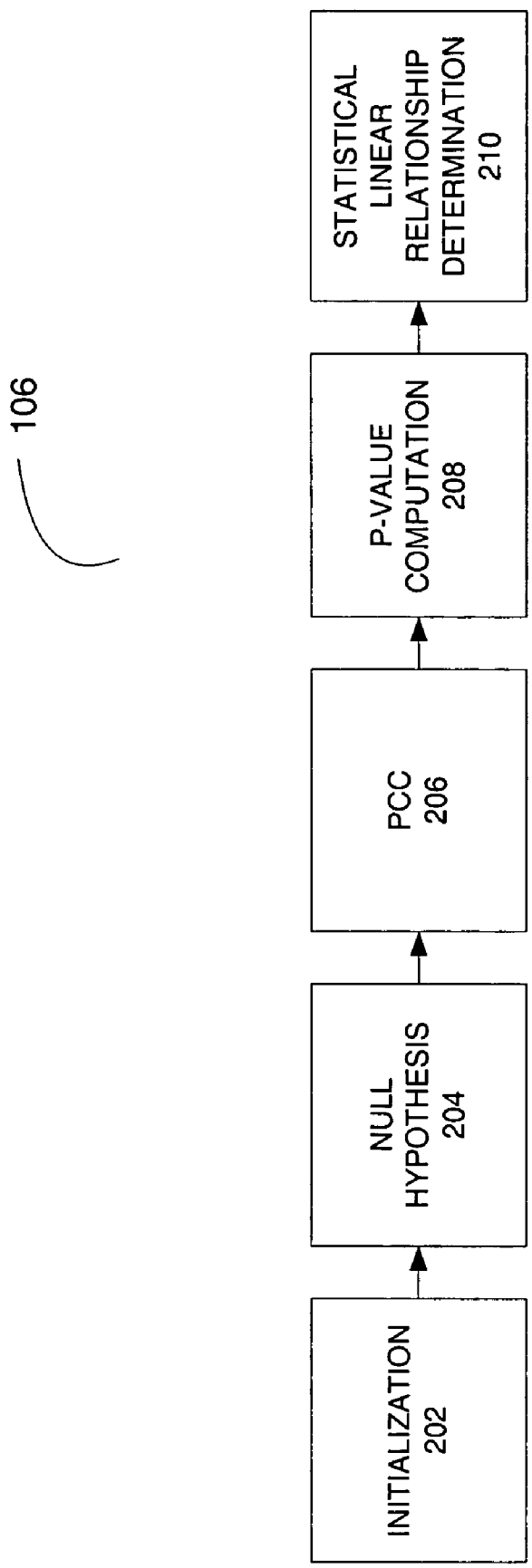
FIG. 2 is a block diagram illustrating an embodiment of t-test computation used with k-means clustering as described with reference to FIG. 1.

FIG. 2 is a block diagram illustrating an embodiment of t-test computation used with k-means clustering as described with reference to FIG. 1. T-test computation 106 starts with initialization 202 by accepting inputs of point ($g_i$), mean cluster (Mc), and a predetermined significance level (SL). SL represents a small value or count, such as 0.01 or 0.05, representing the percentage, 1% or 5%, respectively, of the significance level for determining a statistically linear relationship 210 between the point and mean cluster. The small value of SL represents the probability of a type I error in a hypothesis test. A type I error refers to an error that occurs when a conclusion is drawn that the null hypothesis 204 is false when, in actuality, it is true. In one embodiment, with regard to k-means with t-test, the value of SL may represent the probability of an error occurring when the conclusion is drawn that there is a statistically significant linear correlation between the point and the mean cluster when, in actuality, the correlation is lacking. Once the initialization 202 is performed, the well-known process of null hypothesis 204 is used as the basis for the hypothesis test. Here, the mean $$Mc = \frac{1}{|c|} \sum_{j=1}^{|c|} g_j, \; g_j \epsilon c, \; |c_j|$$

is the number of elements in cluster c, c is the nearest cluster for point $g_i$.

Null hypothesis 204 starts with the assumption that there is no statistically significant linear correlation between the point and the mean cluster. Thus, mathematically, null hypothesis is LinearCorrelation($g_i$, Mc)=0, where SL is the predetermined significance level. Once the absence of any statistically significance linear correlation is assumed, using null hypothesis 204, PCC 206 is then performed to determine whether the linear correlation (r) exists between a point and mean cluster. Here, the correlation (r) is determined using PCC 206 as follows:

$$r(g_i, Mc) = \frac{\sum g_i Mc - \frac{\sum g_i \sum Mc}{N}}{\sqrt{\left(\sum g_i^2 - \frac{(\sum g_i)^2}{N}\right)\left(\sum Mc^2 - \frac{(\sum Mc)^2}{N}\right)}}$$

In one embodiment, once correlation is computed using PCC 206, the correlation distribution value (t) is calculated to compute the probabilistic value (p-value) 208. The p-value can be compared with SL to determine the statistically linear relationship 210. The value of t is calculated as follows $$t = \frac{r}{S_r} = \frac{r}{\sqrt{\frac{1-r^2}{N-2}}}.$$

Also, the well-known standard t table can be used to determine the value of t and then, compute the p-value 208 from the value of t with the degree of flexibility of N−2. Once the p-value is computed 208, it is compared with SL to determine the statistically linear relationship 210 between the point and mean cluster. For example, if p-value is less than or equal to the value of SL (e.g., p-value<=SL), the null hypothesis 204 is rejected and a statistically linear relationship 210 between the point and mean cluster is found.

In one embodiment, the linear relationship within the significance of a group element with the group is evaluated. If an element has linear correlation with its group, then the element is clustered; otherwise, a new cluster is created since current data in hand may not necessarily prove the existence of having a significant linear relationship. Thus, in k-means clustering with t-test computation 106, there is a clear statistical significance, which is "true clustering" in terms of having clustering significance. For example, the value of k represents an initial value without any relevance to the final solution, particularly, when not considering local optimum problem. Even without any initial partition (k'=1), k-means clustering with t-test computation 106 is true, without having being corrupted with the value of k. Stated differently, the partition method of k-means clustering with t-test computation 106 is true and independent of the values set at initialization, for example, when not considering local optimum problems. As described with reference to FIG. 1, initialization 202, null hypothesis 204, PCC 206, p-value computation 208, and statistical linear relationship determination 210 may be performed using various modules and components.

Figure 3:
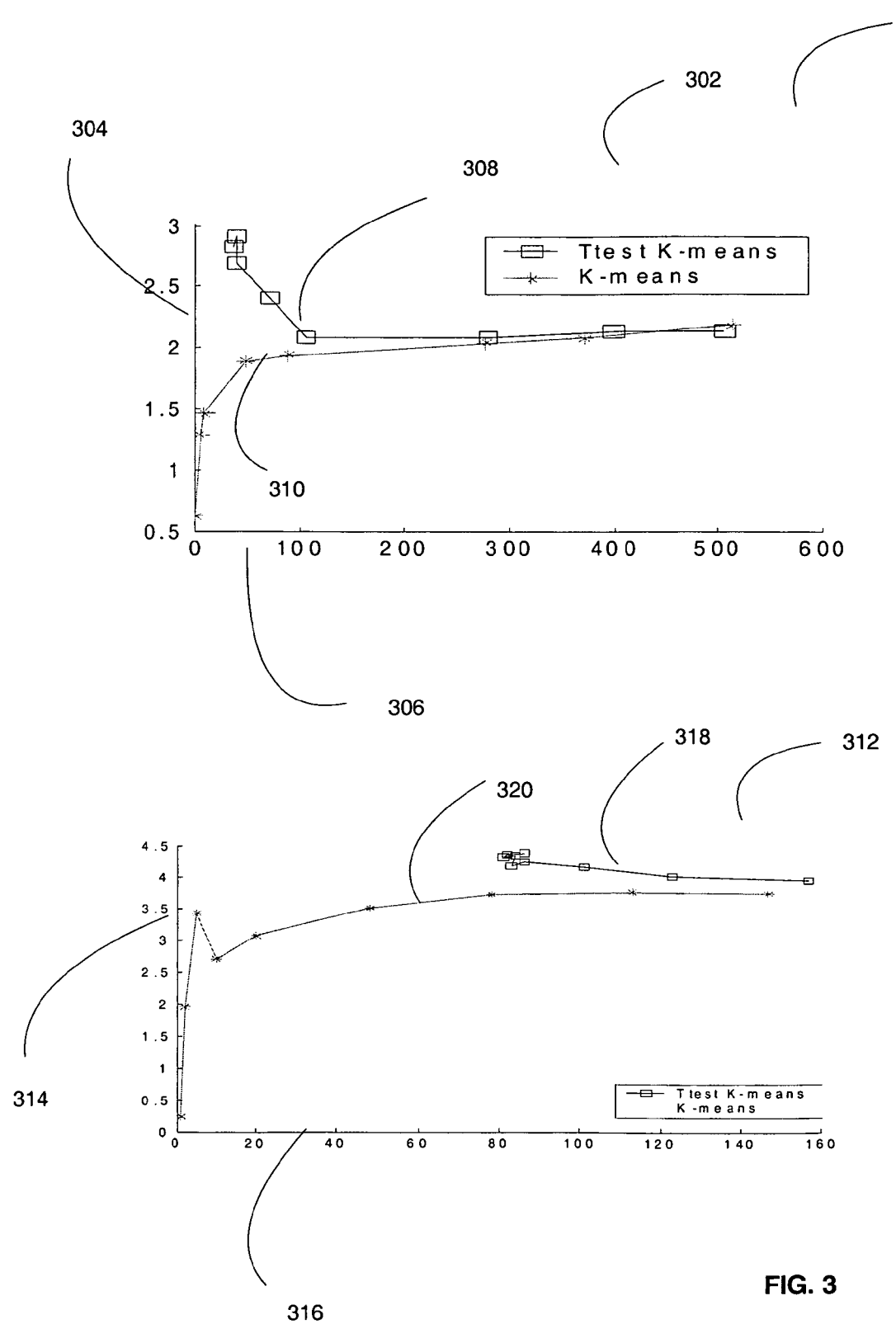
FIG. 3 is a block diagram illustrating results of a comparison experiment using standard k-means clustering and an embodiment of k-means clustering using t-test computation.

FIG. 3 is a block diagram illustrating results of a comparison experiment 300 using standard k-means clustering and an embodiment of k-means clustering using t-test computation. The comparison experiment provides a comparison of the results of k-means clustering with t-test computation 308, 318 and standard k-means 310, 320 on two sample microarray data. The first sample data includes colon data 302. For experimental purposes, the colon data 302 consists of expression profiles for 2000 genes using an Affymetrix Oligonucleotide array in 22 normal and 40 cancer colon tissues (previously available at http://www.molbio.princeton.edu/colondata, and now available at http://www.s-ph.uth.tmc.edu/hgc/downloads.asp (Xiong et al., 2001). The second sample data includes yeast cell-cycle data 312. The yeast cell-cycle data 312 includes monitored genome-wide mRNA expression level of yeast Saccharomycles cerevisiae with ~6200 ORFs, over about two cell cycles, including 679 genes having no missing data in all 18 arrays (available at http://cellcycle-www.stanford.edu). Based on the two intuitive qualities in clustering (e.g., internal cohesion and external isolation), several evaluation criterions, including intra-similarity, inter-similarity, and ratio of intra-similarity to inter-similarity were considered.

For k-means clustering with k clusters generated, intra-similarities, inter-similarities, and the ratio of intra-similarities and inter-similarities are defined as follows:

$$\text{Intra-similarity} = \frac{1}{k}\sum_{j=1}^{k}\frac{1}{|c_j|}\sum_{i=1}^{|c_j|}|r(g_i, Mc_j)|$$

$$\text{Inter-similarity} = \frac{2}{k(k-1)}\left|\sum_{i\neq j}^{k}|r(Mc_i, Mc_j)|\right|$$

$$\text{Ratio} = \frac{\text{Intra-similarity}}{\text{Inter-similarity}}$$

The comparisons in terms of the ratio of intra-similarity to inter-similarity, k is the number of clusters generated by the two k-means. The calculation for intra-similarity, inter-similarity, and the ratio of the two is performed and obtained after k-means clustering (including standard k-means and k-means with test) has been performed. In other words, once the results from k-means clustering have been obtained, the ratio is calculated in order to properly and fairly compare the two results to determine which result is superior, accurate, and true. The predefined values of k' for the colon data 302 are 1, 5, 10, 50, 100, 500, 1000, 2000, as indicated by little squares and astricks imposed on lines 308 and 310, respectively. The predefined values of k' for the yeast cell-cycle data 312 are 1, 2, 5, 10, 20, 50, 100, 200, 679, as indicated by little squares and astricks imposed on lines 318, 320, respectively.

As illustrated, the x-axis 306, 316 is the number of clusters generated (k) and the x-axis 304, 314 represents the ratio of the intra-similarity and inter-similarity. The higher line 308 represents the results of k-means clustering using t-test computation, while the lower line 310 represents the results of standard k-means on the colon data chart 302. With regard to the yeast cell-cycle data chart 312, the higher line 318 represents the results of k-means clustering using t-test computation, while the lower line 320 represents the results of standard k-means.

In both cases 302 and 312, the results from k-means with t-test, as indicated by lines 308, 318, are far superior to the results from the conventional k-means, as indicated by lines 310, 320. Referring to the colon data chart 302, the higher line 308 indicates better ratio 304 than the lower line 310 on virtually every k level 306. Similarly, referring to the yeast cell-cycle data chart 312, the higher line 318 indicates better ratio 314 than the lower line 320 on every k level 316. This shows internal cohesion and external isolation performance when using k-means clustering using t-test computation. For example, when k'=1, k-means with t-test 308, 318 show a much higher ratio, as indicated by the first of several little squares, whereas standard k-means 310, 312 are in the opposite direction showing a much lower ratio, as indicated by the first of many astricks. Hence, as described above, it is shown with this comparison experiment 300 that k-means clustering using t-test computation does not dependent on the initial positions of centers and can provide the best performance and final solution even without the initial partition.

Figure 4:
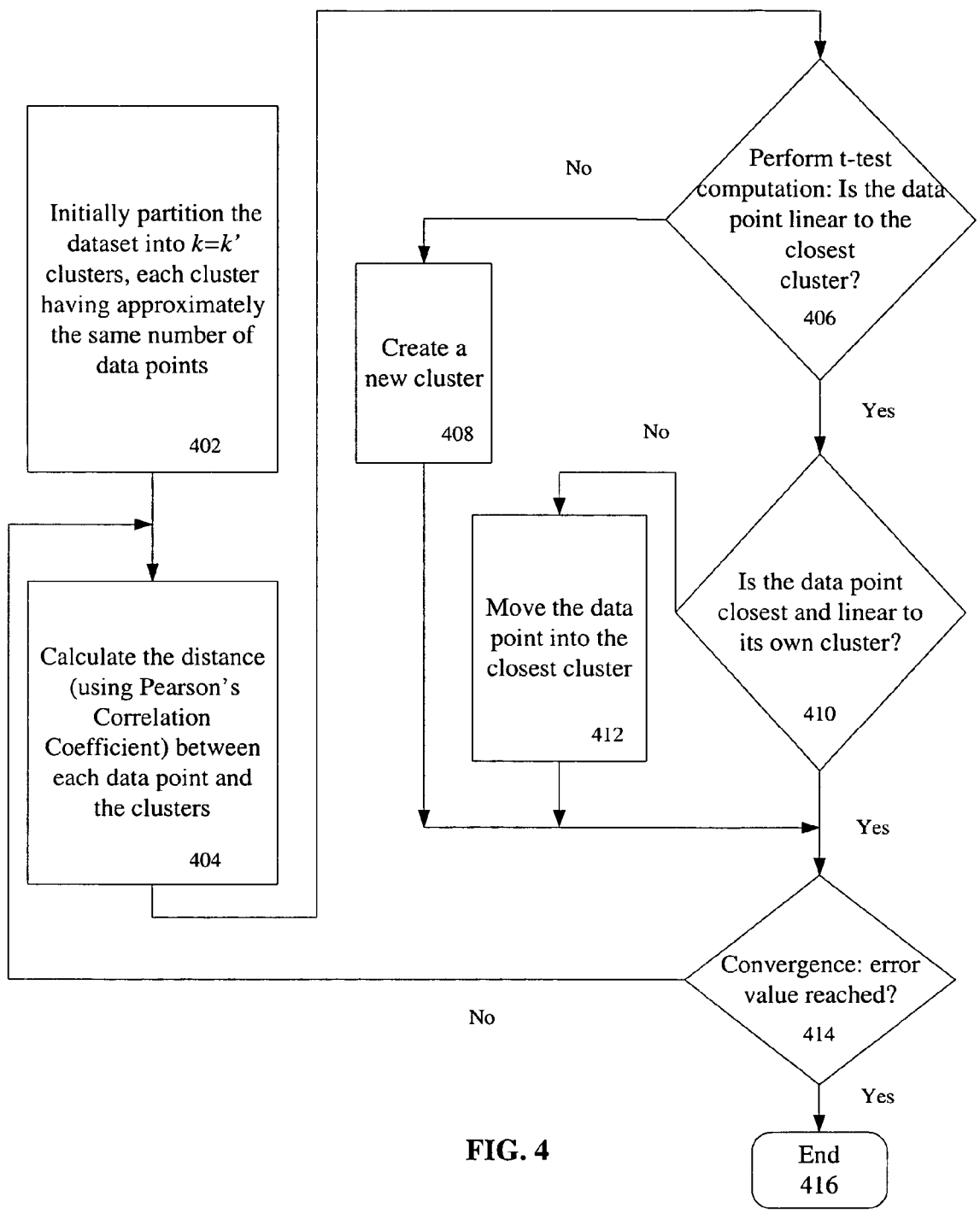
FIG. 4 is a flow diagram illustrating an embodiment of a process for performing k-means clustering using t-test computation.

FIG. 4 is a flow diagram illustrating an embodiment of a process for performing k-means clustering using t-test computation. First, initialization is performed at processing block 402. The initialization process includes partitioning of the dataset into k=k' clusters with each cluster having roughly the same number of data points, and assigning an initial error value ($\epsilon$). At processing block 404, the distance between each data point and clusters is calculated. Such distance may be calculated using Pearson's Correlation Coefficient. In one embodiment, at decision block 406, t-test computation is performed and a determination is made as to whether a data point is statistically linear to a cluster. If not, using the isolation mechanism, such point is isolated and placed in a newly created cluster at processing block 408. If the data point is linear to the cluster, at decision block 410, another determination is made as to whether the data point linear to the cluster is also the closest to it's cluster.

If not, the point is moved into the closest cluster at processing block 412. If the point is linear and closest to the cluster, the process converges at the decision block 414. Similarly, referring back to processing blocks 408, 412, the process converges to the decision block 414, where a determination is made as to continue k-means clustering with t-test computation. If the initial error value, $\epsilon$, is not yet reached, iterations of clustering continue at processing block 404. If the initial error value is reached, the process ends at termination block 416.

Figure 5:
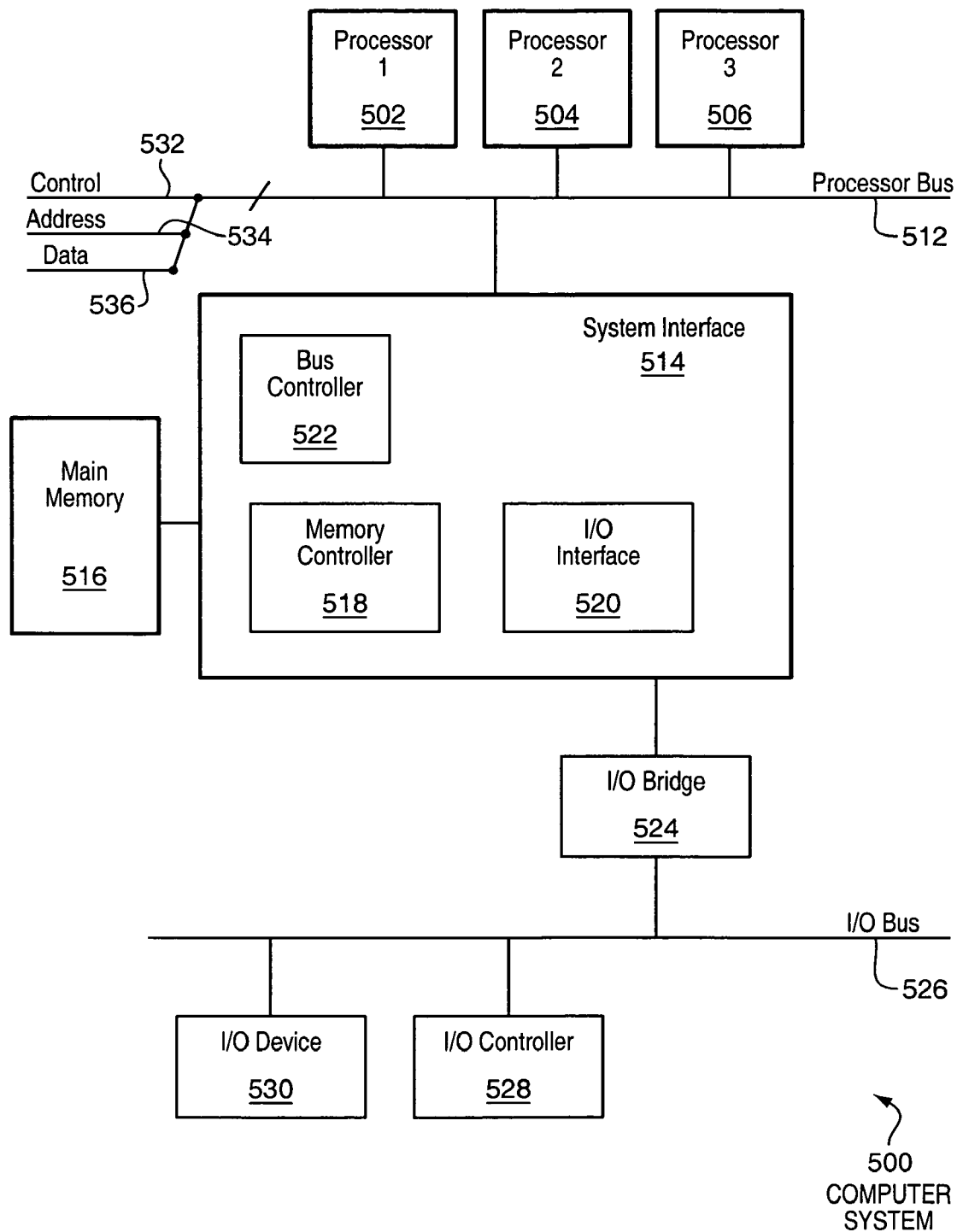
FIG. 5 is a block diagram illustrating an exemplary computer system to be used in implementing an embodiment of the present invention.

FIG. 5 is a block diagram illustrating an exemplary computer system 500 to be used in implementing an embodiment of the present invention. The computer system (system) includes one or more processors 502-506. The processors 502-506 may include one or more single-threaded or multi-threaded processors. A typical multi-threaded processor may include multiple threads or logical processors, and may be capable of processing multiple instruction sequences concurrently using its multiple threads. Processors 502-506 may also include one or more internal levels of cache (not shown) and a bus controller or bus interface unit to direct interaction with the processor bus 512.

Processor bus 512, also known as the host bus or the front side bus, may be used to couple the processors 502-506 with the system interface 514. Processor bus 512 may include a control bus 532, an address bus 534, and a data bus 536. The control bus 532, the address bus 534, and the data bus 536 may be multidrop bi-directional buses, e.g., connected to three or more bus agents, as opposed to a point-to-point bus, which may be connected only between two bus agents.

System interface 514 (or chipset) may be connected to the processor bus 512 to interface other components of the system 500 with the processor bus 512. For example, system interface 514 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. For example, as illustrated, the I/O interface 520 may interface an I/O bridge 524 with the processor bus 512. I/O bridge 524 may operate as a bus bridge to interface between the system interface 514 and an I/O bus 526. One or more I/O controllers and/or I/O devices may be connected with the I/O bus 526, such as I/O controller 528 and I/O device 530, as illustrated. I/O bus 526 may include a peripheral component interconnect (PCI) bus or other type of I/O bus.

System 500 may include a dynamic storage device, referred to as main memory 516, or a random access memory (RAM) or other devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506.

Main memory 516 or dynamic storage device may include a magnetic disk or an optical disc for storing information and instructions. I/O device 530 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 500 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 500 may vary from implementation to implementation depending upon numerous factors, such as price constraints, performance requirements, technological improvements, and/or other circumstances.

It should be noted that, while the embodiments described herein may be performed under the control of a programmed processor, such as processors 502-506, in alternative embodiments, the embodiments may be fully or partially implemented by any programmable or hardcoded logic, such as field programmable gate arrays (FPGAs), transistor transistor logic (TTL) logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

In one embodiment, k-means clustering with t-test computation not only provides a cluster isolation criterion, but also is based on statistical significance of internal correlations. For example, if under a significance level, a point is not proved to have linear correlation with the closest cluster, it is isolated. The isolated point emerges as a new single cluster, because current dataset failed to prove whether the point had statistically significant linear relationship with any other cluster existed in space. On the other hand, a low p-value for this test (less than 0.01, for example) may mean that there is evidence to reject the null hypothesis in favor of the alternative hypothesis, or that there is a statistically significant relationship between the point and its closest cluster. Thus, using t-test provides that each point has statistically significant relationship with the mean of its own cluster. Linear relationship is additive and points within the same cluster are proved to have linear correlations with each other using t-test. Hence, t-test provides a relatively clear statistical interpretation to the internal cohesion. Furthermore, the clustering here does not depend on initial partition and it can obtain best performance and true solution even without any initial partition (e.g., k'=1). The partition result of k-means with t-test has clear statistical significance and is not just a bunch of nearest elements clustered together. It is true clustering in which the elements within one group have significant statistical correlation.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method for clustering comprising:
performing clustering of components of a dataset by detecting similarities and dissimilarities between the components of the dataset, the dataset representing genes, the clustertng of the components is used to facilitate detecting statistical behavior of the genes, and sorting the genes based on the statistical, behavior, the performing of the clustering of the components including
performing k-means clustering of the dataset having the clusters and a plurality of points, wherein the performing of the k-means clustering includes partitioning of the dataset into a plurality of clusters, each cluster having similar components,
determining closeness of a point of the plurality points to a cluster of the plurality of clusters,
performing t-test computation to determine statistical linear relationship between the point and the cluster, maintaining a current position of the point in the dataset if the point is close to the cluster, and if the point has a statistical linear relationship with the cluster, and inserting the components into the plurality of clusters based on the similarities and the dissimilarities between the components, wherein the similarities include one or more of inter-similarity between the components, intra-similarity within a component, and a ratio of the inter-similarity to the intra-similarity; and displaying results of the insertion of the components into the plurality of clusters via a display device, and retrieving one or more of the components to perform one or more functions, wherein the results represent the statistical behavior of the genes, and performing the sorting of the genes based on the statistical behavior.

2. The method of claim 1, further comprising moving the point into a closest cluster if the point is not close to the cluster.

3. The method of claim 1, further comprising:
creating a new cluster if the point is not close to the cluster, and the point does not have a statistical linear relationship with the cluster; and
moving the point into the new cluster.

4. The method of claim 3, wherein the creating of the new cluster is performed via an isolation mechanism.

5. The method of claim 1, wherein the determining of the closeness is performed via Pearson's Correlation Coefficient.

6. The method of claim 1, wherein the performing of the t-test computation to determine statistical linear relationship further comprises:
setting a predetermined significance value;
determining a p-value using at table and the Person's Correlation Coefficient; and
determining the statistical linear relationship by comparing the p-value against the predetermined significance value, wherein the statistical linear relationship is found if the p-value is less than or equal to the predetermined significance value.

7. The method of claim 1, wherein the dataset comprises data relating to a plurality of genes.

8. The method of claim 1, wherein the components comprise components relating to each of the plurality of genes.

9. An apparatus, comprising:
a storage medium to store instructions to perform clustering of components of a dataset by detecting similarities and dissimilarities between the components of the dataset by performing k-means clustering using t-test computation, the dataset representing genes, the k-means clustering of the components is used to facilitate detecting statistical behavior of the genes, and sorting the genes based on the statistical behavior;
a processor coupled with the storage medium, the processor to perform the k-means clustering by
performing the k-means clustering of the dataset having the clusters and a plurality of points, wherein the performing of the k-means clustering includes partitioning of the dataset into a plurality of clusters, each cluster having similar components,
determining closeness of a point of the plurality points to a cluster of the plurality of clusters,
performing the t-test computation to determine statistical linear relationship between the point and the cluster,
maintaining a current position of the point in the dataset if the point is close to the cluster, and if the point has a statistical linear relationship with the cluster, and inserting the components into the plurality of clusters based on the similarities and the dissimilarities between the components, wherein the similarities include one or more of inter-similarity between the components, intra-similarity within a component, and a ratio of the inter-similarity to the intra-similarity;

a display device coupled with the processor to display results of the insertion of the components into the plurality of clusters, wherein the results represent the statistical behavior of the genes, wherein the k-means clustering is used to facilitate the sorting of the genes based on the statistical behavior; and a client computer system coupled with the processor, the client computer system to retrieve one or more of the components to perform one or more functions.

10. The apparatus of claim 9, wherein the processor is further to move the point into a closest cluster if the point is not close to the cluster.

11. The apparatus of claim 9, wherein the processor is further to:
create a new cluster if the point is not close to the cluster, and the point does not have a statistical linear relationship with the cluster; and
move the point into the new cluster.

12. The apparatus of claim 9, wherein the processor is further to:
set a predetermined significance value;
determine a p-value using a t table and the Person's Correlation Coefficient; and
determine the statistical linear relationship by comparing the p-value against the predetermined significance value, wherein the statistical linear relationship is found if the p-value is less than or equal to the predetermined significance value.

13. A system, comprising:
a server having a k-means module to perform clustering of components of a dataset by detecting similarities and dissimilarities between the components of the dataset by performing k-means clustering, the dataset representing genes, the k-means clustering of the components is used to facilitate detecting statistical behavior of the genes, and sorting the genes based on the statistical behavior the server having the k-means module to perform k-means clustering of the dataset having the clusters and a plurality of points, wherein the performing of the k-means clustering includes partitioning of the dataset into a plurality of clusters, each cluster having similar components,
a Pearson Correlation Coefficient module to determine closeness of a point of the plurality points to a cluster of the plurality of clusters,
a t-test module to perform t-test computation to determine statistical linear relationship between the point and the cluster,
a positioning module to maintain a current position of the point in the dataset if the point is close to the cluster, and if the point has a statistical linear relationship with the cluster, and
the k-means module insert the components into the plurality of clusters based on the similarities and the dissimilarities between the components, wherein the similarities include one or more of inter-similarity between the components, intra-similarity within a component, and a ratio of the inter-similarity to the intra-similarity;

a display device coupled with the server, the display device to display results of the insertion of the components into the plurality of clusters, wherein the results represent the statistical behavior of the genes, wherein the k-means clustering is used to facilitate the sorting of the genes based on the statistical behavior; and a client coupled with the server, the client to retrieve one or more of the components to perform one or more functions.

14. The system of claim 13, wherein the positioning module is further to move the point into a closest cluster if the point is not close to the cluster.

15. The system of claim 13, wherein the server comprises an isolation mechanism to:

create a new cluster if the point is not close to the cluster, and the point does not have a statistical linear relationship with the cluster; and move the point into the new cluster.

16. The system of claim 13, wherein the t-test module is further to:

set a predetermined significance value;

determine a p-value using a t table and the Person's Correlation Coefficient; and determine the statistical linear relationship by comparing the p-value against the predetermined significance value, wherein the statistical linear relationship is found if the p-value is less than or equal to the predetermined significance value.

17. The system of claim 13, wherein the dataset comprises data relating to a plurality of genes.

18. The system of claim 13, wherein the components comprise components relating to each of the plurality of genes.

19. A machine-readable medium comprising instructions which, when executed, cause a machine to:

perform clustering of components of a dataset by detecting similarities and dissimilarities between the components of the dataset, the dataset representing genes, the clustering of the components is used to facilitate detecting statistical behavior of the genes, and sorting the genes based on the statistical behavior, the performing of the clustering of the components including performing k-means clustering of the dataset having the clusters and a plurality of points, wherein the performing of the k-means clustering includes partitioning of the dataset into a plurality of clusters, each cluster having similar components, determining closeness of a point of the plurality points to a cluster of the plurality of clusters, performing t-test computation to determine statistical linear relationship between the point and the cluster, maintaining a current position of the point in the dataset if the point is close to the cluster, and if the point has a statistical linear relationship with the cluster, and inserting the components into the plurality of clusters based on the similarities and the dissimilarities between the components, wherein the similarities include one or more of inter-similarity between the components, intra-similarity within a component, and a ratio of the inter-similarity to the intra-similarity;

display results of the insertion of the components into the plurality of clusters via a display device, wherein the results represent the statistical behavior of the genes, and performing the sorting of the genes based on the statistical behavior; and retrieve one or more of the components to perform one or more functions.

20. The machine-readable medium of claim 19, wherein the instructions when further executed, cause the machine to move the point into a closest cluster if the point is not close to the cluster.

21. The machine-readable medium of claim 19, wherein instructions when further executed, cause the machine to:

create a new cluster if the point is not close to the cluster, and the point does not have a statistical linear relationship with the cluster, wherein the new cluster is created using an isolation mechanism; and move the point into the new cluster.

22. The machine-readable medium of claim 19, wherein the instructions when further executed, cause the machine to:

setting a predetermined significance value;

determine a p-value using a t table and the Person's Correlation Coefficient; and determine the statistical linear relationship by comparing the p-value against the predetermined significance value, wherein the statistical linear relationship is found if the p-value is less than or equal to the predetermined significance value.

* * * * *